May 16, 1939.   A. W. BRIERLEY ET AL   2,158,397
DEVICE FOR DELIVERING MILK BOTTLES OR THE LIKE
Filed Sept. 27, 1937   3 Sheets-Sheet 1

INVENTORS
A.W. BRIERLEY
N. DUNKERLEY
J. HUNTER

By Young, Emery & Thompson   ATTORNEYS

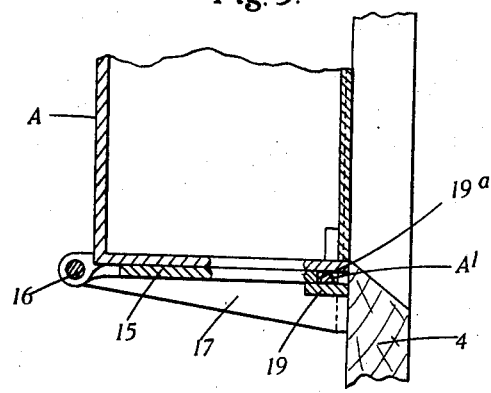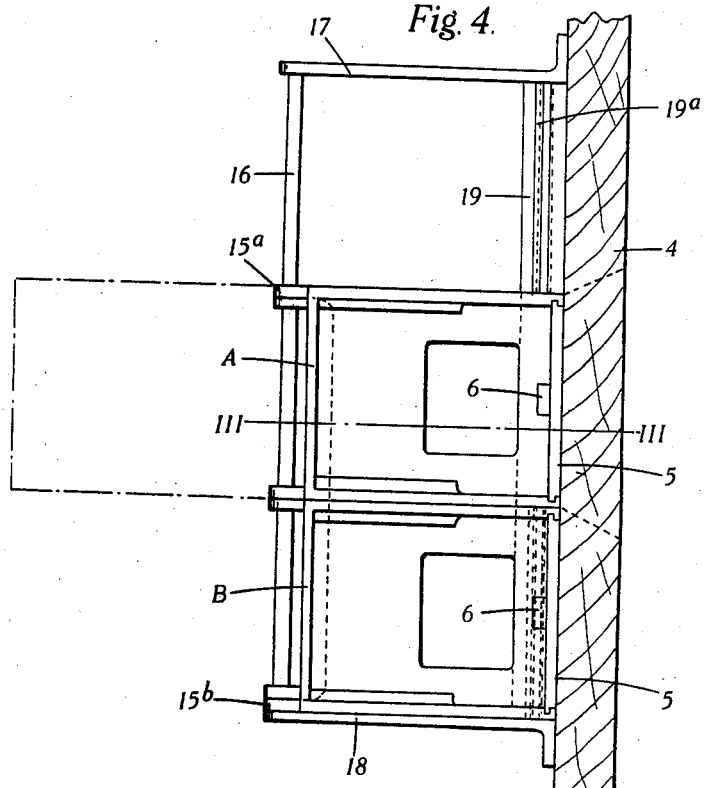

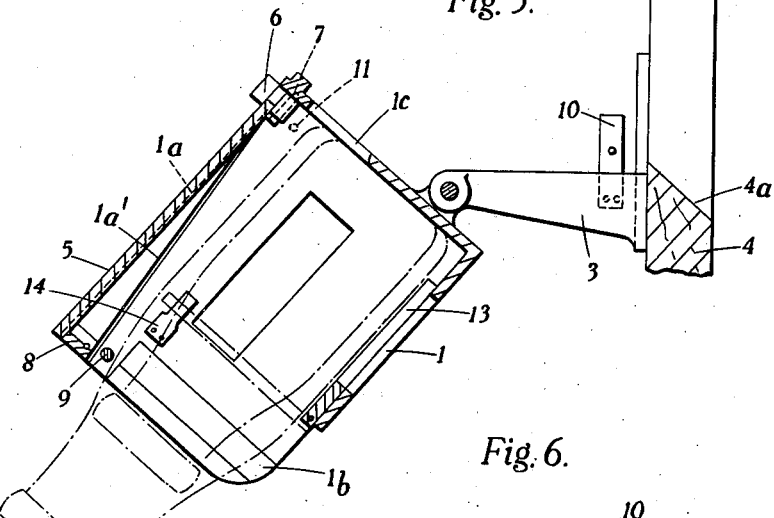
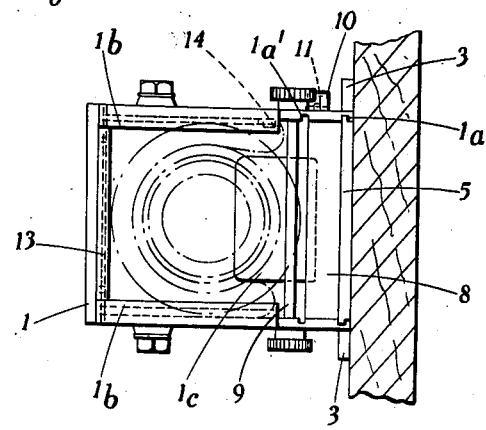

Patented May 16, 1939

2,158,397

UNITED STATES PATENT OFFICE 2,158,397

DEVICE FOR DELIVERING MILK BOTTLES OR THE LIKE

Abraham Walton Brierley and Norman Dunkerley, Monkseaton, and John Hunter, Newcastle-on-Tyne, England Application September 27, 1937, Serial No. 166,014
In Great Britain September 30, 1936

9 Claims. (Cl. 232—41)

This invention relates to devices for delivering milk bottles or the like, said devices being of the kind in which the milk bottle or the like is passed through a small opening formed in the house door or other convenient member.

It is well known that milk bottles are subjected to various unhygienic uses before they are returned to the dairy, that heavy losses occur, and that large numbers get broken causing serious loss to milk delivery firms. It is the object of the present invention to provide an inexpensive device which will enable the above undesirable features of milk delivery to be obviated in a simple and effective manner, that is to say while allowing the purchaser to have the advantage of milk supplies in bottle it prevents said purchaser from using it for any other purpose or removing it from the device. Another object of the invention is to provide means whereby the return of correct bottles to the dairyman is assured and the possibility of substituting bottles other than those delivered by the dairyman eliminated.

The device according to the invention comprises a receptacle having its upper portion so formed that the orifice of the milk bottle or the like is accessible from the exterior without its being possible to withdraw the bottle through said upper portion, while one of its sides has an opening for insertion and withdrawal of the bottle and a closure member adapted to open and close said opening, said receptacle being mounted to swing about a horizontal axis, and means for retaining the receptacle in its uppermost position.

The invention will now be described by way of example with reference to the accompanying drawings.

In said drawings:

Fig. 3 is a partial sectional elevation taken on the line III—III of Fig. 4, and shows in semi-diagrammatic form a modified form of the invention comprising two receptacles.

Fig. 4 is a plan of Fig. 3.

Fig. 5 is a similar view to Fig. 1 showing the receptacle tilted.

Fig. 6 is a plan of Fig. 1.

Figure 1:
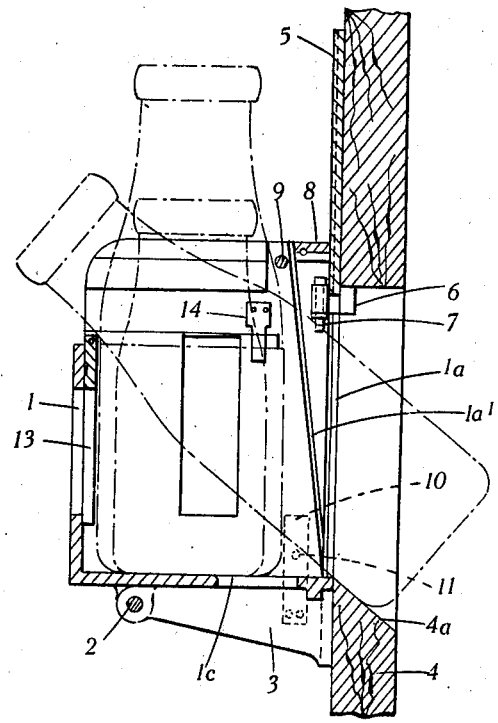
Fig. 1 is a sectional elevation of a receptacle for containing a single milk bottle.
Figure 2:
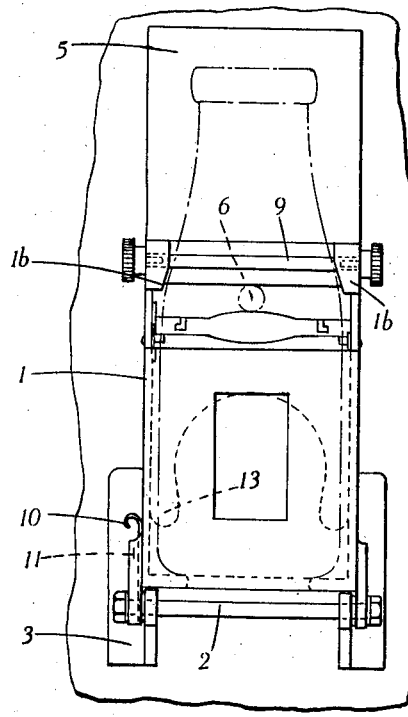
Fig. 2 is a front view of Fig. 1.

Referring more particularly to Figs. 1 and 2, the receptacle comprises a rectangular box 1 the lower side of which is hinged about a horizontal axis 2 between a pair of brackets 3 which are adapted to be secured to a door 4, or other convenient member so that the level of the floor of the box 1 is substantially in alignment with the lower edge of an opening 4a in the door 4. The side of the box 1 adjacent the door 4 is open, and the sides whose edges abut against the door 5 are grooved near said edges at 1a to receive a vertically slidable door 5 which is provided with a lock 6 operating latches 7. A second groove $1a^1$ inclined to the vertical is provided for use where there is a beading above the door 5 so that said beading will not foul the latter, a removable cover section 8 being removed to allow of withdrawal and insertion of the door 5 from and into said groove.

The upper portion of the box is open but is provided with inclined side abutments 1b and a transverse bar 9 such that while allowing of the bottle freely to be pushed upwardly at an angle from the outside through the door opening 4a into the box, said abutments and bar engage the shoulder of the bottle so that the latter cannot be removed from the box from the inside.

The box is retained in its vertical position by means of a spring catch 10 on one of the brackets 3 which catch is adapted to engage a projection 11 on one of the sides of the box.

The floor of the box is cut away at 1c to facilitate the dairyman inserting his fingers to withdraw and insert the bottle.

In use the dairyman unlocks the sliding door 5, raises it and withdraws the empty bottle. He then inserts the fresh bottle by pushing it upwards at an angle of substantially 45° as shown in dotted lines until the lower portion of the bottle is inside the box 1 where it then stands vertically. The sliding door 5 is then dropped and locked automatically.

When the householder requires milk she releases the box from the bracket 3 by pulling the retaining catch 10 out of engagement with the projection 11 on the bracket 3, after first having removed the closure from the bottle. She then tilts the box 1 about its hinge 2 so that the box and bottle occupy a position such as is shown in Fig. 5, and so empties the contents of the bottle into a milk jug or other receptacle. As the milk bottle cannot be withdrawn from the box, the tilting and pouring operations are effected without any risk of the bottle dropping out of its receptacle. The emptied milk bottle may be rinsed by tilting it to its vertical position, pouring water into it and then emptying the water into a convenient receptacle, but this is not necessary where there is a delivery a day.

For smaller milk bottles the device is provided with an auxiliary bifurcated abutment 13 which is hingedly attached to the inside of the box 1. When not in use the abutment 13 hangs vertically as shown. When a smaller bottle is required the abutment 13 is brought into operative position by the dairyman, by his raising its free end through an angle of about 90–100 degrees, as shown in dotted lines, in which position it engages a spring detent 14 which holds it in its working position in which it embraces the bottle for over half its periphery and so serves as an abutment preventing the extraction of the bottle from the box. When not required a slight pressure releases the abutment 13 from its working position which falls back to its inoperative position at the back of the box 1.

Where more bottles than one are required to be delivered, two or more receptacles as above described are hinged to a platform or bracket so that when the one receptacle is dealt with, the dairyman slides the one dealt with until the next receptacle is opposite the opening in the door, said receptacles preferably being separately hinged so that each receptacle may be tilted without interfering with the other.

Figs. 3 and 4 show an arrangement in which two receptacles A, B similar to the device shown in and described with reference to Figs. 1 and 2 are separately hinged to a platform 15 by being threaded over a rod 16 supported between two brackets 17, 18 secured to the door 4, said platform 15 itself being slidably mounted by means of lugs 15a, 15b on the rod 16 on side, and on the other side on a runner rail 19 secured to the door 4. The inner portion of the rail 19 comprises a raised ledge 19a and has a dovetail groove formed therein the middle third portion of which is cut away. The free ends of the boxes A, B are adapted to rest on the ledge 19a and have undercut ridges—ridge $A^1$ on the box A: the ridge on the box B cannot be indicated conveniently—formed on their undersides for engagement with the groove in the ledge 19a when either of the boxes A, B is at one end of the travel of the platform 15.

When the milkman delivers the milk he proceeds as described in connexion with Figs. 1 and 2, and then pushes the box to the one side. As the boxes A, B are on the same platform 15, this movement brings the other box opposite the opening 4a and the milkman similarly delivers to the other box. When the householder requires the milk she first sees that one of the boxes (A as shown for example) is in the middle position. In this position the ridge $A^1$ is out of engagement with the groove in the ledge 19a so that the box A may be tilted as shown in dotted lines in Fig. 4. After the box A has been restored to its normal position, the householder slides it—and so the platform 15 and box B—to the left to bring the box B clear of the groove in the ledge 19a, whereupon she then tilts the box B.

For a panelled door where the panels are narrower than the distance between the brackets 17, 18, distance pieces are arranged between the lower portion of the door opening 4a and the platform 15.

It will be seen that with the device according to the invention, the bottle after being delivered is virtually under the control of the dairyman, so that the risk of loss and breakages is practically eliminated, so neither can the bottles be used for other purposes. Hence the invention gives an improvement both from the standpoint of hygiene and the reduction of bottle breakages and losses.

We claim:

1. A device for delivering milk bottles and the like comprising a support, a receptacle pivotally mounted about a horizontal axis on said support, the upper portion of said receptacle being so formed that the orifice of the bottle is accessible from the exterior without its being possible to withdraw the bottle through said upper portion, an orifice in one of the sides of said receptacle through which the bottle is adapted to be inserted, a closure member adapted to open and close said orifice and means for retaining said receptacle in its uppermost position.

2. A device according to claim 1 comprising a box-like structure, an orifice in one side of said structure, a door adapted to close said open side, and a lock on said door.

3. A device according to claim 1 comprising a box-like structure which is open on one side, the sides of said opening being vertically grooved and a vertically slidable door in said grooves and a lock on said door.

4. A device according to claim 1, an open topped receptacle and side and transverse abutments adapted to engage the bottle shoulder.

5. A device according to claim 1 comprising a movable auxiliary abutment adapted to abut against the shoulders of small size bottles, and means for retaining said abutment in the operative position.

6. A device according to claim 1 comprising a bifurcated auxiliary abutment hingedly secured to the inside of the receptacle, said abutment being adapted to be swung into a horizontal position, and means for retaining said abutment in said horizontal position.

7. A device for delivering more than one milk bottle through an opening, comprising a bracket, a horizontally slidable platform on said bracket and a plurality of receptacles hinged to said bracket about a horizontal axis, the upper portion of each of said receptacles being so formed that the orifice of the bottle is accessible from the exterior without its being possible to withdraw the bottle through the said upper portion, an orifice in one of the sides of the said receptacle through which the bottle is adapted to be inserted, a closure member adapted to open and close said orifice and means for retaining said receptacle in its uppermost position, said bracket being adapted to be secured with regard to said opening so that the platform is substantially at the same level as the lower edge of said opening, so that any one of said receptacles may be slid until its orifice is brought opposite said opening.

8. A device according to claim 7 comprising means whereby when one receptacle is tiltable the remainder is locked against tilting.

9. A device according to claim 7 comprising a ledge on said bracket, said ledge having an undercut groove formed therein, undercut ridges on the underside of said receptacles adapted to engage with said groove, said ledge having its mid-portion cut away whereby when a receptacle is in the operative position it is free to be tilted.

ABRAHAM WALTON BRIERLEY.
NORMAN DUNKERLEY.
JOHN HUNTER.